(12) United States Patent
Need et al.

(10) Patent No.: US 7,562,305 B2
(45) Date of Patent: Jul. 14, 2009

(54) DYNAMICALLY-GENERATED COMMANDING INTERFACE

(75) Inventors: Dwayne Need, Woodinville, WA (US); Gregory Cavanaugh Franklin, Kirkland, WA (US); Kevin B. Gjerstad, Kirkland, WA (US); Nicholas M. Kramer, Seattle, WA (US); Yutaka Nakajima, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 599 days.

(21) Appl. No.: 10/717,195

(22) Filed: Nov. 18, 2003

(65) Prior Publication Data

US 2005/0104859 A1  May 19, 2005

(51) Int. Cl.
*G06F 3/00* (2006.01)
(52) U.S. Cl. .................. 715/744; 715/764; 715/762
(58) Field of Classification Search .............. 715/764, 715/744, 762; 345/172
See application file for complete search history.

(56) References Cited

U.S. PATENT DOCUMENTS

| | | | |
|---|---|---|---|
| 5,761,420 A | | 6/1998 | Johnson et al. |
| 5,790,120 A | | 8/1998 | Lozares et al. |
| 5,881,318 A | | 3/1999 | Liebenow |
| 5,892,512 A | * | 4/1999 | Donnelly et al. ............. 715/764 |
| 5,973,688 A | | 10/1999 | May |
| 6,008,806 A | * | 12/1999 | Nakajima et al. ........... 715/744 |
| 6,167,455 A | | 12/2000 | Friedman et al. |
| 6,246,405 B1 | * | 6/2001 | Johnson ....................... 715/764 |
| 6,262,729 B1 | * | 7/2001 | Marcos et al. ............... 715/744 |
| 6,307,548 B1 | | 10/2001 | Flinchem et al. |
| 6,313,854 B1 | | 11/2001 | Gibson |
| 6,330,006 B1 | * | 12/2001 | Goodisman ................. 715/762 |
| 6,356,965 B1 | | 3/2002 | Broyles et al. |
| 6,400,382 B1 | | 6/2002 | Davis |
| 6,429,882 B1 | * | 8/2002 | Abdelnur et al. ............ 715/763 |
| 6,934,778 B2 | | 8/2005 | Numano |
| 2004/0056894 A1 | * | 3/2004 | Zaika et al. ................. 345/762 |
| 2005/0022165 A1 | | 1/2005 | Ruff |

OTHER PUBLICATIONS

Berman, A., "Actions that live in Delphi," http://www.delphipages.com/news/detaildocs.cfm?ID=16, pp. 1-5 (Dec. 17, 1999).

Clemenzi, R., "Delphi User Interface Design Using Actions, Menus, and ToolBars," http://www.cpcug.org/user/clemenzi/technical/Languages/Delphi/UserInterfaceDesign.html, pp. 1-12 (Date Unknown).

Swart, B., "Dr. Bob on Delphi Actions and Action Lists," http://www.drbob42.com/delphi4/actions.htm, 5 pages (© 2000-2004).

(Continued)

*Primary Examiner*—Stephen S Hong
*Assistant Examiner*—Phenuel S Salomon
(74) *Attorney, Agent, or Firm*—Merchant & Gould P.C.

(57) ABSTRACT

A commanding system for a computer. The system includes a memory storing a binding table that connects input to associated action, at least one binding in the binding table including an interface binding. The system also includes a processor in data communication with the memory, the processor programmed to query each binding in the binding table, receive the interface binding associated with the binding; and generate a command interface based on the interface binding. The command interface is dynamically generated based on the information provided by the interface binding. Examples of command interfaces include toolbars and menus.

7 Claims, 10 Drawing Sheets

OTHER PUBLICATIONS

"Command Targets," *Microsoft Corporation*, 1 page (© 2004).

"Mapping Messages," *Microsoft Corporation*, 1 page (© 2004).

"Message Categories," http://msdn.microsoft.com/library/en-us/vccore/html/_core_message_categories.asp?frame=true, *Microsoft Corporation*, pp. 1-2 (© 2004).

"Messages and Commands in the Framework," *Microsoft Corporation*, 1 page (© 2004).

"Messages," *Microsoft Corporation*, 1 page (© 2004).

"Microsoft Foundation Class Library Development Guidelines," *Microsoft Corporation*, pp. 1-26 (© 1995-1996).

"TN071: MFC IOleCommandTarget Implementation," http://msdn.microsoft.com/library/en-us/vcmfc98/html/vccontn07Imfciolecommandtargetimplementation.asp?frame=true, *Microsoft Corporation*, pp. 1-5 (© 2004).

"User-Interface Objects and Command IDs," http://msdn.Microsoft.com/library/en-us/vccore/html/_core_User.2d.Interface_Objects_and_Command_IDs.asp?frame=true, *Microsoft Corporation*, pp. 1-2 (© 2004).

"WM_Appcommand Notification," http://msdn.microsoft.com/library/en-us/winui/WinUI/WindowsUserInterface/UserInput/KeyboardInput/KeyboardInputReference/Keyboar . . . , *Microsoft Corporation*, pp. 1-5 (© 2004).

"WM_Command Notification," http://msdn.microsoft.com/library/en-us/winui/winui/windowsuserinterface/resources/menus/menureference/menumessages/wm_command . . . , *Microsoft Corporation*, pp. 1-2 (© 2004).

\* cited by examiner

US 7,562,305 B2

DYNAMICALLY-GENERATED COMMANDING INTERFACE

TECHNICAL FIELD

The present invention relates to commanding for a computer system and, more particularly, to a dynamically-generated commanding interface for a computer system.

BACKGROUND

A commanding system allows a user's input to a computer system to be connected to an action performed by the computer in response to the input. One example of commanding is the connection of the input keystroke "ctrl-c" to the action of copying of the selected material to the clipboard. One existing commanding system is the Microsoft Foundation Class (MFC) Library. Commanding systems such as the MFC Library are implemented on an application-by-application basis. In other words, in existing commanding systems, commanding is handled by each application individually.

Toolbars and menus are two examples of user interface elements that are typically provided with an application (or program) of a computer system. Toolbars and menus are integral to a commanding system, since the image buttons in toolbars and menu items in menus function as inputs that are connect to actions by the commanding system. For example, using a mouse to select an image button on a toolbar is an input that is connected to the action associated with the image button by the commanding system.

Toolbars and menus are typically developed in conjunction with the development of an application. Therefore, different applications can include toolbars and menus that are structured differently and function differently. The differences in the functionality of toolbars and menus across different applications can lead to inconsistencies in the manner in which inputs are connect to actions by the commanding system.

SUMMARY

The present invention relates to commanding for a computer system and, more particularly, to a dynamically-generated commanding interface for a computer system. A commanding interface is dynamically generated by querying commanding elements associated with an application.

One aspect of the invention is a commanding system for a computer, including a memory storing a binding table that connects input to associated action, at least one binding entry in the binding table including an interface binding. In addition, the system includes a processor in data communication with the memory, the processor programmed to: query each binding in the binding table, receive the interface binding associated with the binding, and generate a command interface based on the interface binding.

Another aspect of the invention is a computer readable medium having data structure stored thereon for use in commanding within a computing environment, the data structure including a first binding table including a plurality of first bindings, at least one of the plurality of first bindings including a command binding, a command, a handler, and an interface binding.

Yet another aspect of the invention is a method for commanding a computer system, including: receiving a request to dynamically create a commanding interface; querying a binding table, the binding table including a plurality of binding entries, at least one binding entry of the plurality of bindings entries including a command binding, a command, a handler, and an interface binding; and building the commanding interface based on the interface binding provided for the binding entry.

BRIEF DESCRIPTION OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention relates to commanding for a computer system and, more particularly, to a dynamically-generated commanding interface for a computer system. A commanding interface is dynamically generated by querying commanding elements associated with an application.

Figure 1:
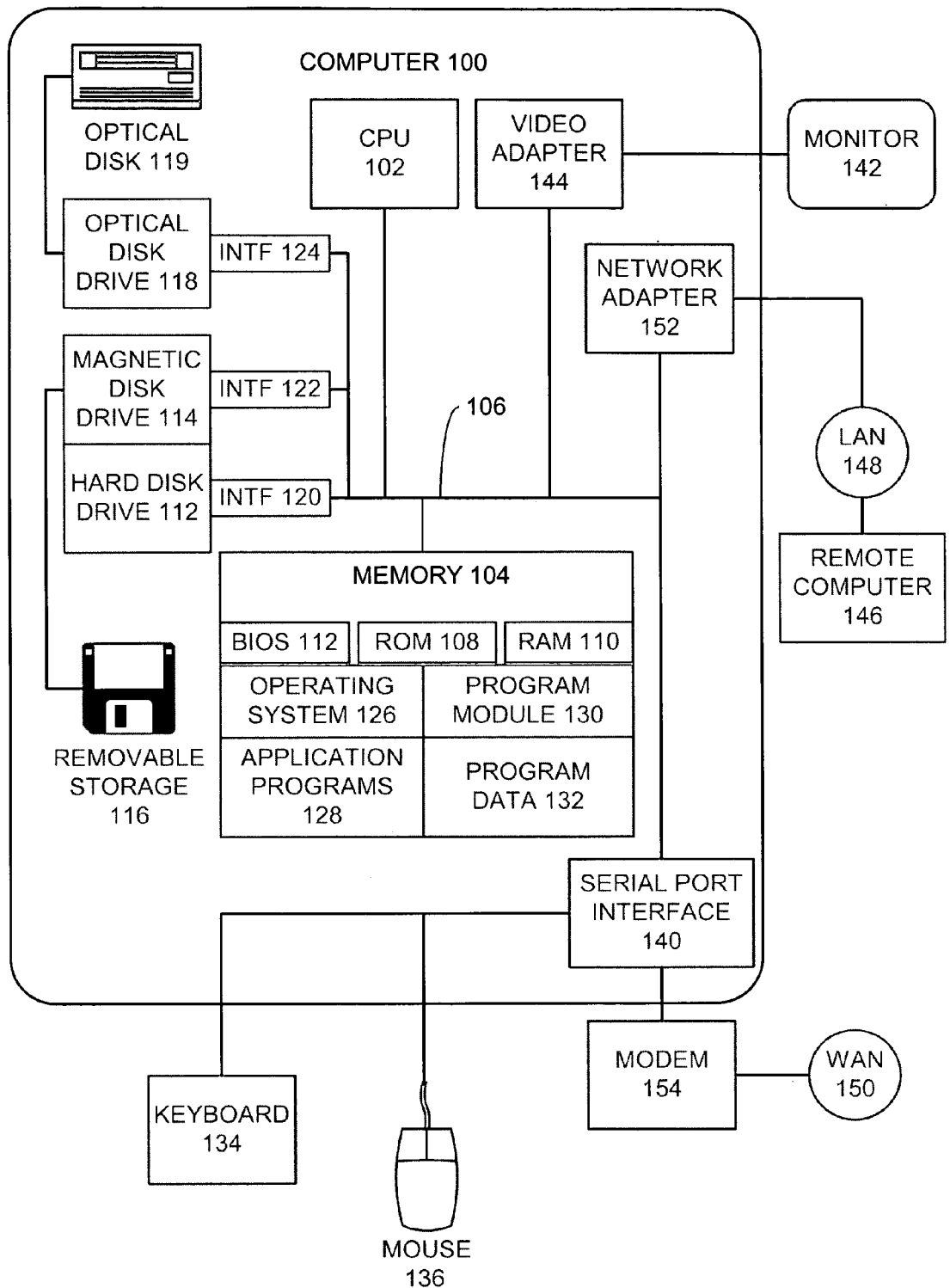
FIG. 1 illustrates an example general purpose computing system according to an embodiment of the present invention.

Referring now to FIG. 1, an example computer system 100 is illustrated. The computer system 100 illustrated in FIG. 1 can take a variety of forms such as, for example, a desktop computer, a laptop computer, and a hand-held computer. In addition, although computer system 100 is illustrated, commanding as disclosed herein can be implemented in various alternative computer systems as well.

The system 100 includes a processor unit 102, a system memory 104, and a system bus 106 that couples various system components including the system memory 104 to the processor unit 100. The system bus 106 can be any of several types of bus structures including a memory bus, a peripheral bus and a local bus using any of a variety of bus architectures. The system memory includes read only memory (ROM) 108 and random access memory (RAM) 110. A basic input/output system 112 (BIOS), which contains basic routines that help transfer information between elements within the computer system 100, is stored in ROM 108.

The computer system 100 further includes a hard disk drive 112 for reading from and writing to a hard disk, a magnetic disk drive 114 for reading from or writing to a removable magnetic disk 116, and an optical disk drive 118 for reading from or writing to a removable optical disk 119 such as a CD ROM, DVD, or other optical media. The hard disk drive 112, magnetic disk drive 114, and optical disk drive 118 are connected to the system bus 106 by a hard disk drive interface 120, a magnetic disk drive interface 122, and an optical drive interface 124, respectively. The drives and their associated computer-readable media provide nonvolatile storage of computer readable instructions, data structures, programs, and other data for the computer system 100.

Although the example environment described herein can employ a hard disk 112, a removable magnetic disk 116, and a removable optical disk 119, other types of computer-readable media capable of storing data can be used in the example system 100. Examples of these other types of computer-readable mediums that can be used in the example operating environment include magnetic cassettes, flash memory cards, digital video disks, Bernoulli cartridges, random access memories (RAMs), and read only memories (ROMs).

A number of program modules can be stored on the hard disk 112, magnetic disk 116, optical disk 119, ROM 108, or RAM 110, including an operating system 126, one or more application programs 128, other program modules 130, and program data 132.

A user may enter commands and information into the computer system 100 through input devices such as, for example, a keyboard 134, mouse 136, or other pointing device. Examples of other input devices include a toolbar, menu, touch screen, microphone, joystick, game pad, pen, satellite dish, and scanner. These and other input devices are often connected to the processing unit 102 through a serial port interface 140 that is coupled to the system bus 106. Nevertheless, these input devices also may be connected by other interfaces, such as a parallel port, game port, or a universal serial bus (USB). A liquid-crystal display (LCD) 142 or other type of display device is also connected to the system bus 106 via an interface, such as a video adapter 144. In addition to the display 142, computer systems can typically include other peripheral output devices (not shown), such as speakers and printers.

The computer system 100 may operate in a networked environment using logical connections to one or more remote computers, such as a remote computer 146. The remote computer 146 may be a computer system, a server, a router, a network PC, a peer device or other common network node, and typically includes many or all of the elements described above relative to the computer system 100. The network connections include a local area network (LAN) 148 and a wide area network (WAN) 150. Such networking environments are commonplace in offices, enterprise-wide computer networks, intranets, and the Internet.

When used in a LAN networking environment, the computer system 100 is connected to the local network 148 through a network interface or adapter 152. When used in a WAN networking environment, the computer system 100 typically includes a modem 154 or other means for establishing communications over the wide area network 150, such as the Internet. The modem 154, which can be internal or external, is connected to the system bus 106 via the serial port interface 140. In a networked environment, program modules depicted relative to the computer system 100, or portions thereof, may be stored in the remote memory storage device.

It will be appreciated that the network connections shown are examples and other means of establishing a communications link between the computers may be used.

The embodiments described herein can be implemented as logical operations in a computing system. The logical operations can be implemented (1) as a sequence of computer implemented steps or program modules running on a computer system and (2) as interconnected logic or hardware modules running within the computing system. This implementation is a matter of choice dependent on the performance requirements of the specific computing system. Accordingly, the logical operations making up the embodiments described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Figure 2:
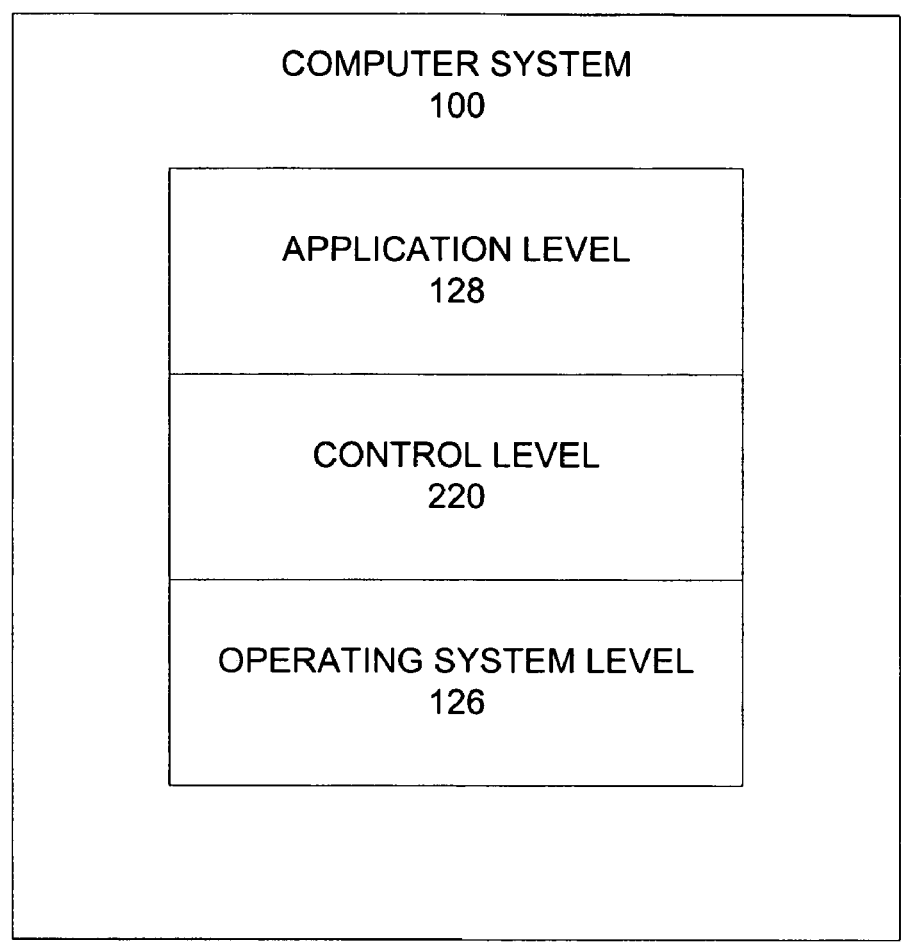
FIG. 2 illustrates an example computing environment of the computer system of FIG. 1.

Referring now to FIG. 2, an example computing environment for the computer system 100 is shown. The computer system 100 includes operating system level 126, which includes software that interfaces with the hardware components of the computer 100 and performs rudimentary tasks. At a higher level shown in FIG. 2, application level 128 of computer system 100 includes various applications designed to assist a user in performance of a specific task. A control level 220 (sometimes referred to as the user interface level) is logically positioned between the operating system level 126 and application level 128. The control level 220 includes software that manages various elements of a graphical user interface.

Figure 3:
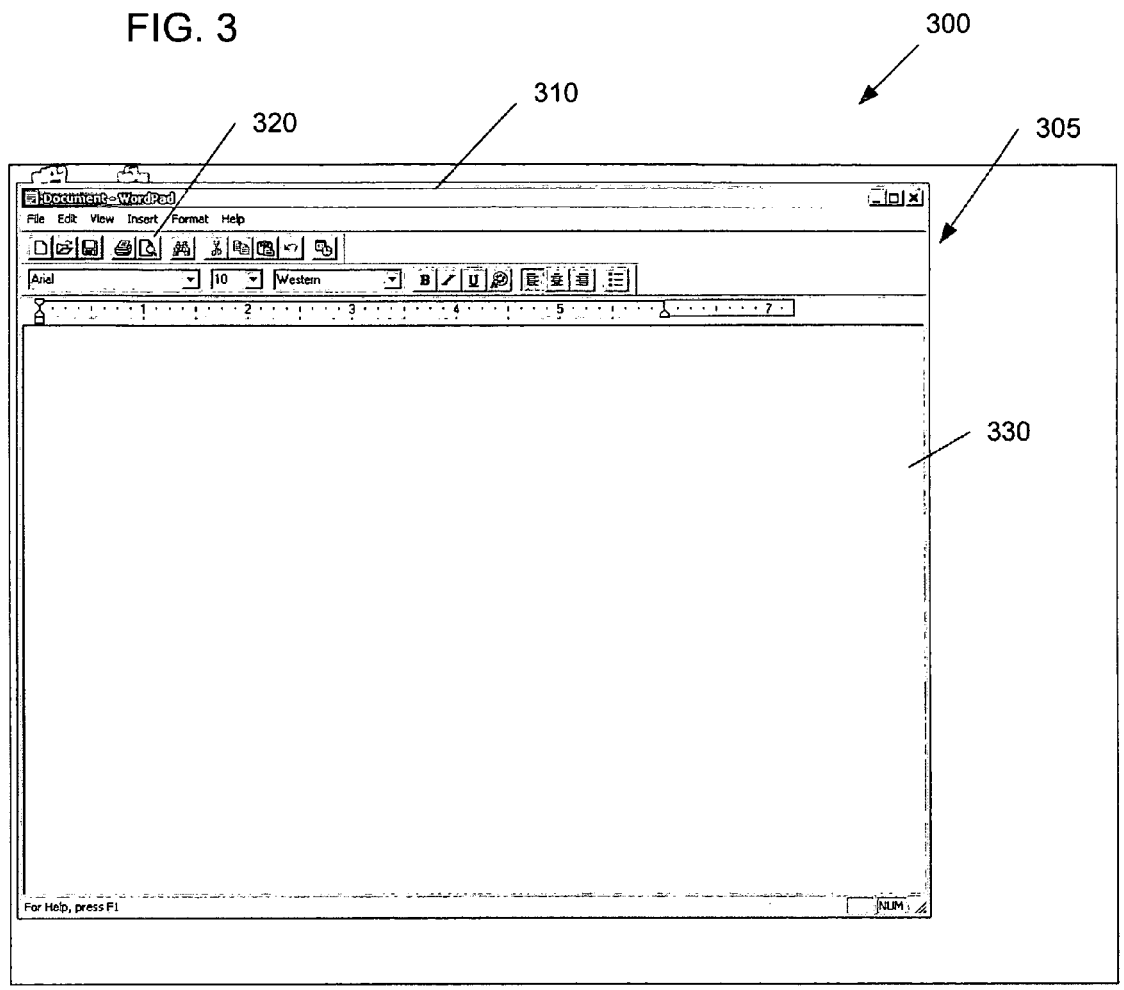
FIG. 3 illustrates an example operating environment for the computer system of FIG. 2.

Referring now to FIG. 3, an example user interface 300 for an application is provided. The example user interface 300 includes various control elements that are implemented at the control level. For example, the user interface 300 includes focus window 305, panel 310, button 320, and text box 330. The panel 310 is displayed in the focus window 305, and button 320 and text box 330 are displayed in panel 310.

The user interface illustrated in FIG. 3 is one example user interface, and various modifications can be made. For example and without limitation, the interface shown in FIG. 3 can be a user interface for the WordPad application, which is provided as an accessory application to various versions of MICROSOFT® WINDOWS® operating systems. In the illustrated embodiment, the focus window 305 is the window in which the application and control elements are shown. The panel 310 is positioned within the focus window 305. Likewise, button 320 and text box 330 are provided within the panel 310. For example, as shown, the button 320 is a button on a toolbar of the WordPad application, and the text box 330 is the portion of the panel 310 where a user inputs text.

The features of the user interface 300 illustrated in FIG. 3 (i.e., focus window 305, panel 310, button 320, and text box 330) can be logically represented as nodes of a hierarchical tree. For example, referring now to FIG. 4, an embodiment of a tree 400 is illustrated. Each node of the tree 400 (e.g., nodes 405, 410, 420, and 430) corresponds to a feature of the user interface 300 shown in FIG. 3: Specifically, the nodes of the tree 400 correspond to the features of the user interface 300 as follows:

node 405 corresponds to focus window 305;
node 410 corresponds to panel 310;

node 420 corresponds to button 320; and node 430 corresponds to text box 330.

The nodes of the tree 400 are arranged in a hierarchical structure to represent the arrangement of the underlying features. In the example embodiment set forth herein, node 405, which logically represents focus window 305, is the parent to all other nodes in the tree 400 because all other features of the user interface fall within the focus window 305. Likewise, node 410, representing panel 310, is a descendant of node 405 because the panel 310 falls within the focus window 305. Similarly, nodes 420 and 430 represent button 320 and text box 330 within panel 310, which are on the same hierarchical level and are both descendants of node 410.

Figure 4:
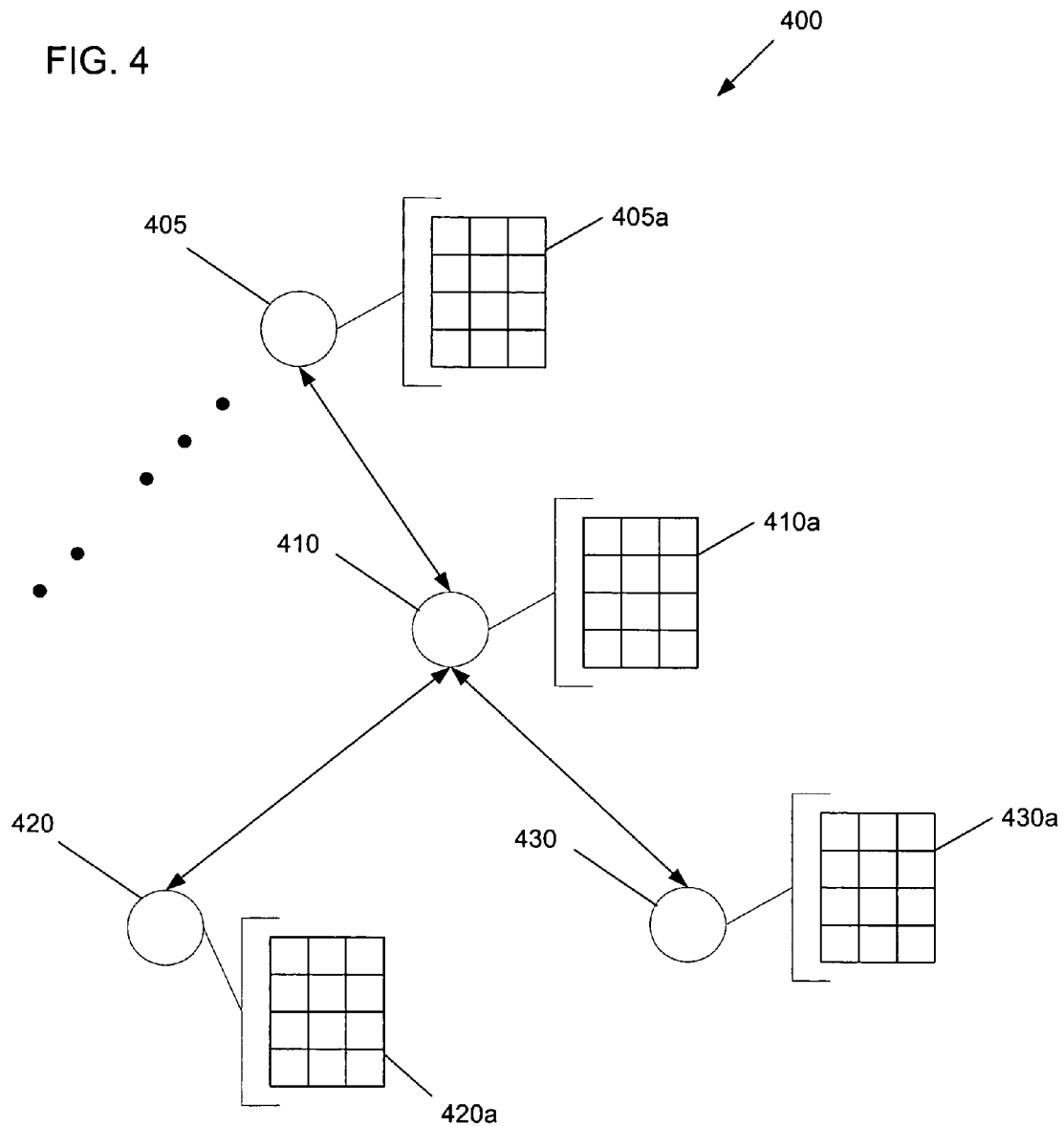
FIG. 4 illustrates an example hierarchical tree according to an embodiment of the present invention.

Each node of tree 400, can, but need not, be associated with a binding table. Generally, a binding table is a lookup table including a plurality of binding entries that connect inputs to actions. As illustrated in FIG. 4, node 405 is associated with binding table 405a. Likewise, nodes 410, 420, and 430 are associated with binding tables 410a, 420a, and 430a, respectively.

Figure 5:
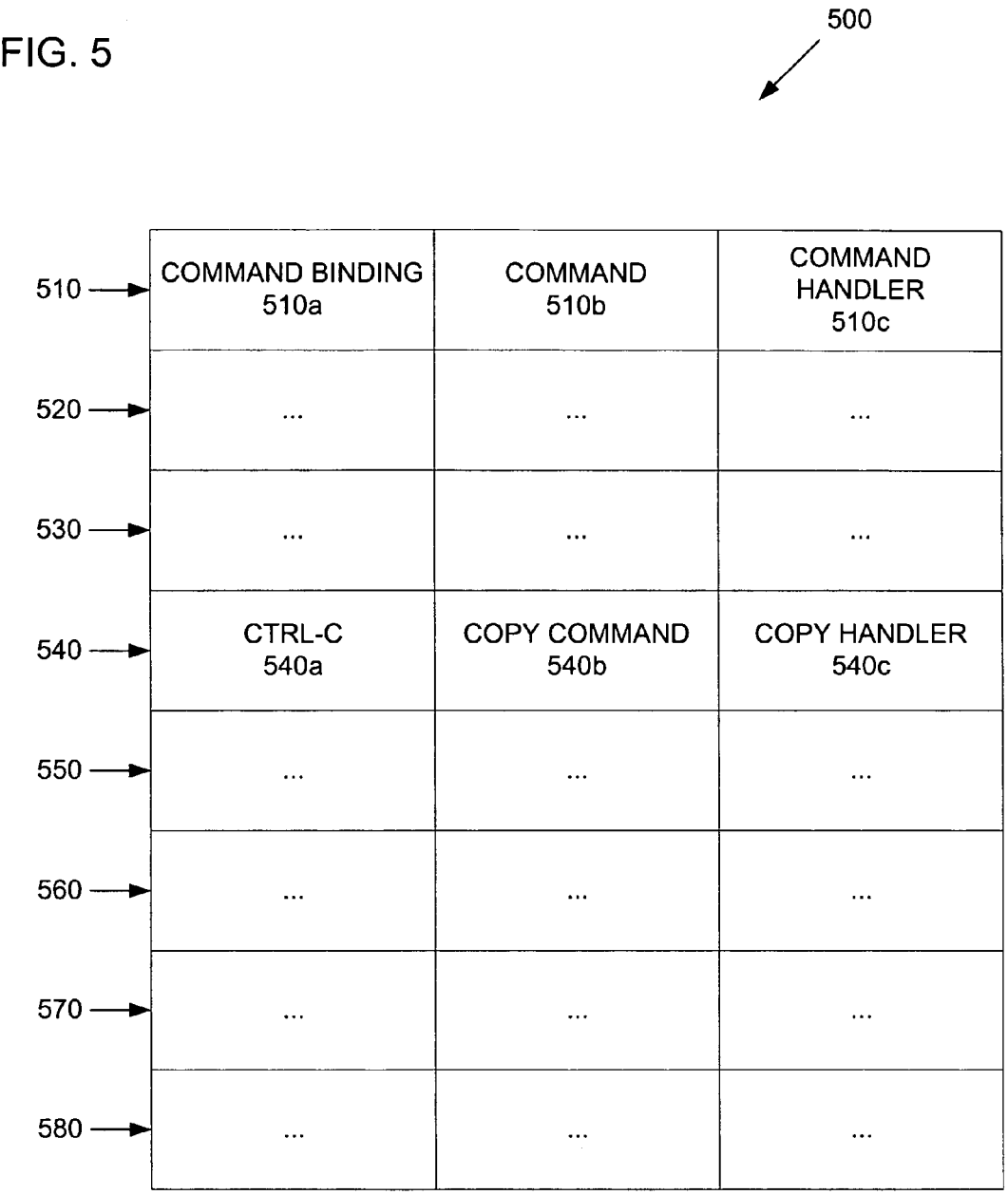
FIG. 5 illustrates an example binding table including a plurality of binding elements according to an embodiment of the present invention.

An example binding table 500 is illustrated in FIG. 5. The binding table 500 includes a plurality of binding entries 510, 520, 530, 540, 550, 560, 570, and 580. More or fewer binding entries also can be provided. Generally, each example binding entry of binding table 500 provides information that allows an action to be connected to an input that invokes the action. More specifically, binding entry 510 includes a command binding 510a, a command 510b, and a command handler 510c. The command binding 510a represents the input sequence (e.g., "ctrl-c") from an input device that is received by the computer system 100 and that is to be acted upon. The command 510b is a label that identifies the raw intent of the input sequence (e.g., "copy"). The command handler 510c is a pointer to a portion of code that is executed to implement the action that is to be performed based upon the input sequence.

For example, binding entry 540 shown in FIG. 5 is an entry in the binding table 500 for the "copy" command. The command binding 540a for binding entry 540 is the input sequence, in the illustrated case the keystroke, "ctrl-c." The command 540b is the label describing the intent of the input sequence, "copy." The command handler 540c is the object that is executed to actually implement the intent of the user, copying of selected material to the clipboard.

In one example embodiment, pseudo-code for implementing each entry of the binding table is as follows.

<CommandLink Command=copy key="ctrl-c"

invoke=copy_handler/>

In this example "commandlink" structure, the "Command" defines the command (i.e., "copy," 540b), the key defines the command binding ("ctrl-c," 540a), and the invoke defines the command handler (i.e., "copy_handler," 540c). A series of these commandlinks can be listed to create a binding table.

Figure 6:
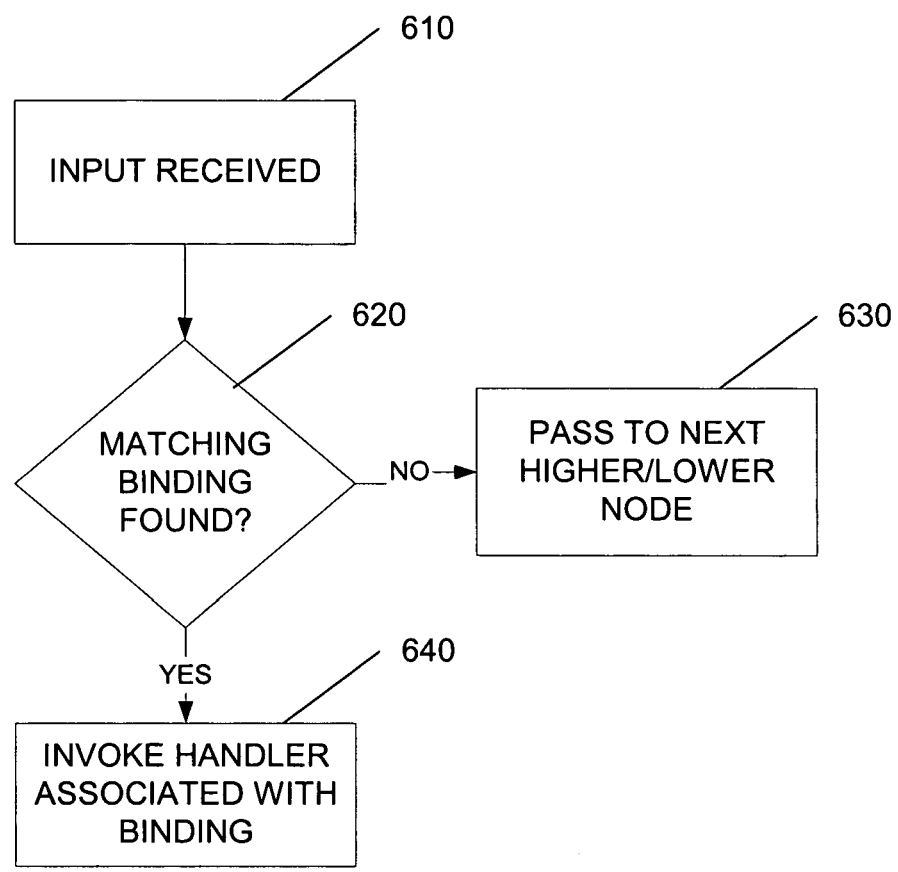
FIG. 6 illustrates an example flow diagram for implementing commanding according to an embodiment of the present invention.

Generally, an example of how commanding, or the connection of an input to action, is implemented is illustrated in FIG. 6. At operation 610, input is received from, for example, an input module of the computer system 100 configured to accept an input sequence from an input device. Next, at operation 620, the node receiving the input examines the binding table associated with the node to determine if the table includes a matching command binding. If a matching command binding is found, the command handler associated with the matching command binding is invoked at operation 640. Alternatively, if a matching command binding is not found in the node's binding table, control can be passed to operation 630, and the input is bubbled to the next higher node in tree 400, as described further below.

Referring again to FIGS. 3 and 4, as described above, when the user interface 300 receives an input sequence (e.g., from a user using an input device such as, for example, a keyboard or mouse), the binding table associated with that node that receives the input is traversed in an attempt to connect the input sequence to an action. In addition to traversing the binding table associated with the input, the input can also be forwarded to nodes in tree 400 that are parents and children to the node, and the binding tables associated with these parent and children nodes traversed as well in an attempt to connect the input sequence to an action.

In one possible embodiment, the input can be traversed through the tree 400 in two directions. Bubbling occurs when the tree 400 is traversed upward from a child to its parent, grandparent, etc. Conversely, tunneling occurs when the tree 400 is traversed downward from a parent to its child, grandchild, etc. As described further below, by bubbling and tunneling the input through nodes that are parents and children of the node that originally receives the input, additional and more flexible commanding functionality can be realized.

For example, referring again to FIGS. 3 and 4, assume that an input sequence is received at the text box 330 of the user interface 300. Node 430 in tree 400 represents the text box 330 implemented at the control level 220. When the input is received, the binding table 430a associated with the node 430 is examined in an attempt to match the input to a command binding in the table 430a. In addition, the input can be bubbled to the parent of node 430 in the tree 400, node 410, so that the binding table 410a associated with node 410 can be examined in an attempt to identify a matching command binding in the table 410a. Tunneling in the opposite direction can also be done if, for example, node 410 had a child node. In one possible embodiment, the input is tunneled down to a base node, and then bubbled up to the original node.

Figure 7:
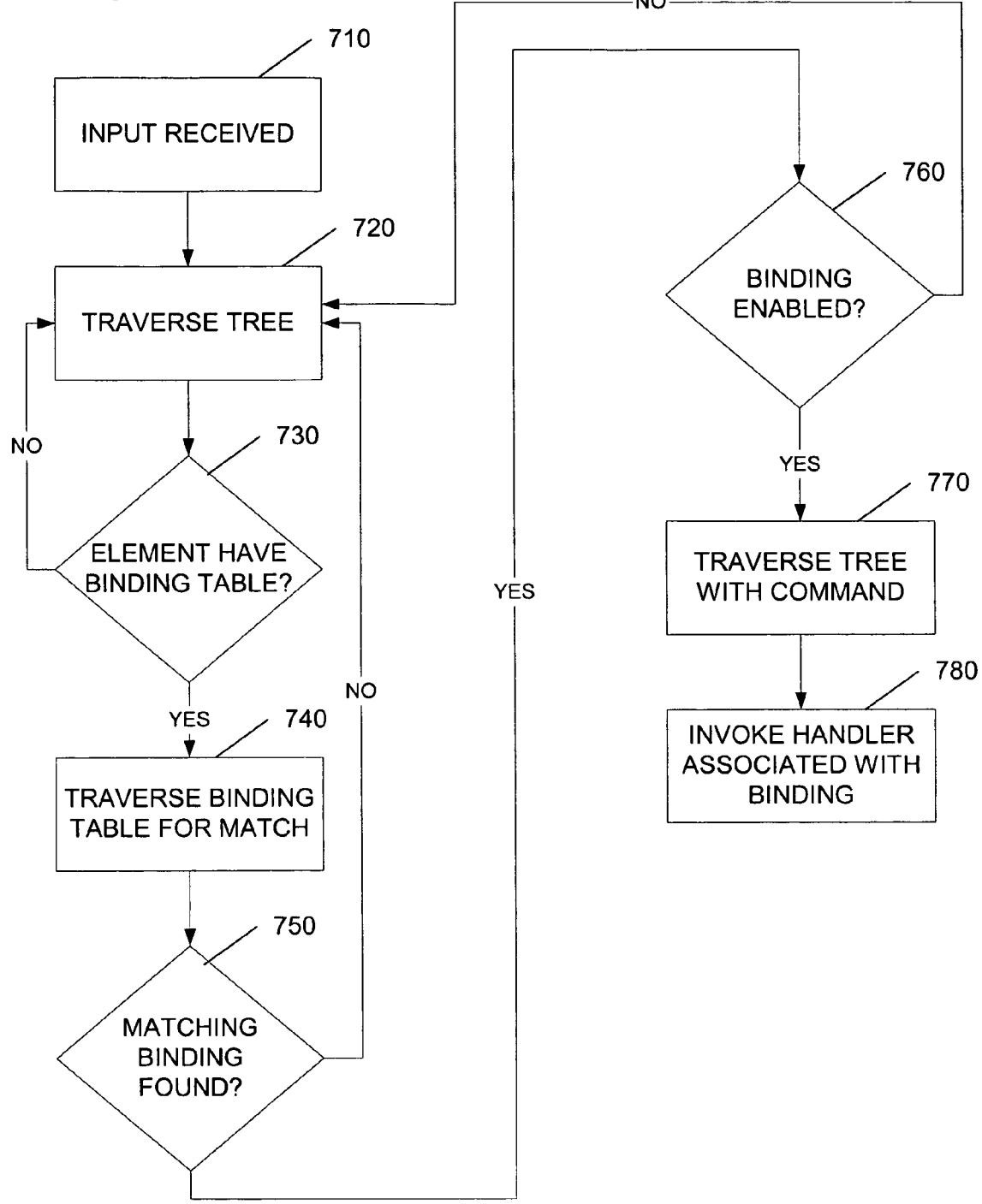
FIG. 7 illustrates another example flow diagram for implementing commanding according to an embodiment of the present invention.

In some example embodiments, the input sequence can be bubbled through the parent nodes in the tree 400 regardless of whether or not a particular node has a matching command binding in its binding table. For example, an embodiment of this operational flow is illustrated in FIG. 7. At operation 710, the input sequence is received. Beginning at operation 720, the input is traversed through tree 400 (e.g., bubbled and/or tunneled). The operation 720 begins at the node that has received the input. At operation 730, the node is checked to determine whether the node has a binding table associated with it (not all nodes may be associated with a binding table, as noted below).

If the node does not have an associated binding table, control is passed back to operation 720 and the input is bubbled or tunneled to the next parent or child node in the tree. If the node does have an associated binding table, the binding table is traversed at operation 740 to determine if the binding table has a command binding that matches the input sequence. At operation 750, if a matching command binding is not found in the table, control is passed back to operation 720 and the input is bubbled or tunneled to the next node in the tree.

If a matching command binding is found in the table, control is passed to operation 760, where it is determined whether or not the matching command binding is enabled. Binding entries within a binding table can be enabled or disabled depending on various factors surrounding commanding for the node. For example and without limitation, if the computer system 100 is not connected to a printer, binding entries in the binding table associated with printing can be disabled because such an action is not possible. If the matching command binding is not enabled, control is passed back to operation 720 and the input is bubbled or tunneled to the next node in the tree.

Enabling of commands can be implemented in several manners. For example, each entry in the binding table can have an enabled property associated with it to indicate whether or not the entry is enabled. In another embodiment, an additional handler can be associated with each binding entry so that, if an input sequence matches a specific entry, the handler invokes a section of code that is used to determine whether or not the entry is enabled. In another embodiment, the command associated with a matching binding entry can be tunneled and bubbled separately, as described below, so that another binding entry in the same or a different binding table can determine whether or not the entry is enabled.

If the matching command binding is enabled, the tree can be traversed (i.e., tunneled and bubbled) at operation 770 using the matching command associated with the matching command binding. Specifically, the tree can be traversed and each binding table examined to determine if any element has a specific command handler for the matching command.

There can be a variety of reasons why it may be desirable to traverse the tree a second time with the matching command. For example, a binding entry in a given binding table may provide a matching command binding and command, but may not include a command handler associated with the matching command. In this case, the matching command can be tunneled and bubbled in an attempt to find a matching command handler in a parent or child node. In another example, while a matching command in a binding table of a node may include an associated command handler, it is possible that a parent or child of the element may include a different "action" or command handler for a matching command. For example, although a matching command and command handler may be found in a binding table of a node, the node's parent may indicate that the matching command is not enabled and therefore the matching command handler should not be invoked. In another example, a binding table may not have a command binding for a particular input sequence, but may have a command handler for the command associated with the input sequence. Consequently, by bubbling and tunneling the command, a particular command can possibly be handled by a binding entry that does not have a matching command binding. Therefore, additional commanding information can be ascertained by bubbling and tunneling the matching command.

Finally, once the tree has been traversed with the matching command, at operation 780 the command handler associated with the matching binding entry is invoked to cause the action associated with the input sequence.

With reference again to FIGS. 4, 5, and 7, an operational flow illustrating how a specific input is handled is as follows. Initially, a copy "ctrl-c" input is received from the keyboard (operation 710) to copy text selected in text box 330 (corresponding to node 430). Next, the tree 400 is traversed, starting at node 430 (operation 720). Because node 430 has a binding table (operation 730), the binding table 430a is traversed to see if it has a matching command binding (operation 740).

Assuming that the binding table 430a of node 430 is table 500 illustrated in FIG. 5, binding entry 540 provides a matching command binding 540a (operation 750). Next, assuming the matching command binding 540a is enabled (operation 760), the matching command 540b associated with the matching command binding 540a is traversed through the tree 400 (operation 770). Assuming that none of the parent or children nodes to node 430 provide otherwise, the command handler 540c associated with the matching command 540b is then invoked and the selected text is copied to the clipboard (operation 780).

In this manner, the various nodes in the tree 400, which all represent features that are implemented at the control level, can accept an input sequence and connect the input to an action using the associated binding table. If a matching command binding is not found, the input can be bubbled to the next higher node in the tree 400, and its binding table can be examined for a matching command binding. In other words, if a given node of the tree 400 does not include a matching binding, one of its parents may include a matching binding which will allow the input to be connected to its given action.

This extension of commanding to the control level can allow for individual control elements so that specific control elements can be configured to handle input sequences as desired. Therefore, because the nodes of the tree 400 logically represent control elements (e.g., control elements 310, 320, and 330) in the control level, commanding can be provided in both the application level as well as control level of the computer system 100, thereby providing greater flexibility in commanding.

If conflicting information is contained with a given binding table, the conflict can be resolved in a number of manners. For example, in one embodiment, conflicting binding entries in a binding table are resolved using a "last entry wins" rule. For example, if two binding entries in a table match an input sequence, the last entry in the table dictates how the input sequence is handled. Other methods can also be used to handle conflicts such as, for example, a "first entry wins" rule.

In an alternative embodiment, multiplexed events can also be associated with a given node in the tree 400. For example, a multiplexed event can be associated with a node to specify that a particular command handler is to handle all input sequences passed to the node regardless of the type of input sequence. For example, a multiplexed event can be used when several commands have similar handling logic. In this manner, a single command handler can handle all inputs passed to the node.

In other alternative embodiments, binding entries in a binding table may not specify all properties for particular bindings. For example, a particular control element or application element can include a binding entry indicating that the element understands a particular command (e.g., "copy"), but the entry may not provide additional information regarding, for example, an input sequence or command handler associated with the command. This additional information can be ascertained, for example, through tunneling and bubbling.

In yet another alternative embodiment, information associated with input sequences received by a focus element (i.e., the element of a user interface that is currently in used by a user, or 305 of FIG. 3) can be forwarded to other control elements or application elements if the focus element cannot understand a given input sequence. For example, if a scroll bar is currently the focus element, and the user provides an input sequence of "ctrl-c," the nodes associated with the scroll bar may not be able to link the "copy" command associated with the input sequence to a specific action. However, the command can be "forwarded" to, for example, an adjacent node not in the direct lineage of the node which received the input. For example, this adjacent node can be associated with a text box that, while not a focus element, is currently open in the user interface. The copy command can be bubbled through the adjacent node's lineage and handled based on the commanding for the text box (i.e., the text box can include one or more bindings to handle the copy command). In this manner, commands that cannot be handled by the focus element may be handled by other control elements or application elements.

Although the example tree 400 and associated operational flow diagrams have been described with respect to a specific number of nodes in the tree 400, more or fewer nodes can also be provided depending on the number of control elements and application elements in a given user interface. In addition, not every node in a tree may include a binding table. For example, if a node receives an input sequence and does not have a binding table, the node can bubble and/or tunnel the input through the tree, and a parent or child can handle the input.

As previously noted, nodes in the tree 400 can correspond to elements in both the control level and the application level. In addition, although examples disclosed herein have focused on the copy command, the commanding systems and methods described herein can be configured to handle a variety of inputs from various input devices.

Additional details regarding alternative embodiments of the commanding systems described above can be found in U.S. patent application Ser. No. 10/717,307, entitled "Extension of Commanding to Control Level;" U.S. patent application Ser. No. 10/717,302, entitled "Attaching Services to Commanding Elements;" and U.S. patent application Ser. No. 10/717,189, entitled "Providing Multiple Input Bindings Across Device Categories," all of which are hereby incorporated by reference in their entireties.

Figure 8:
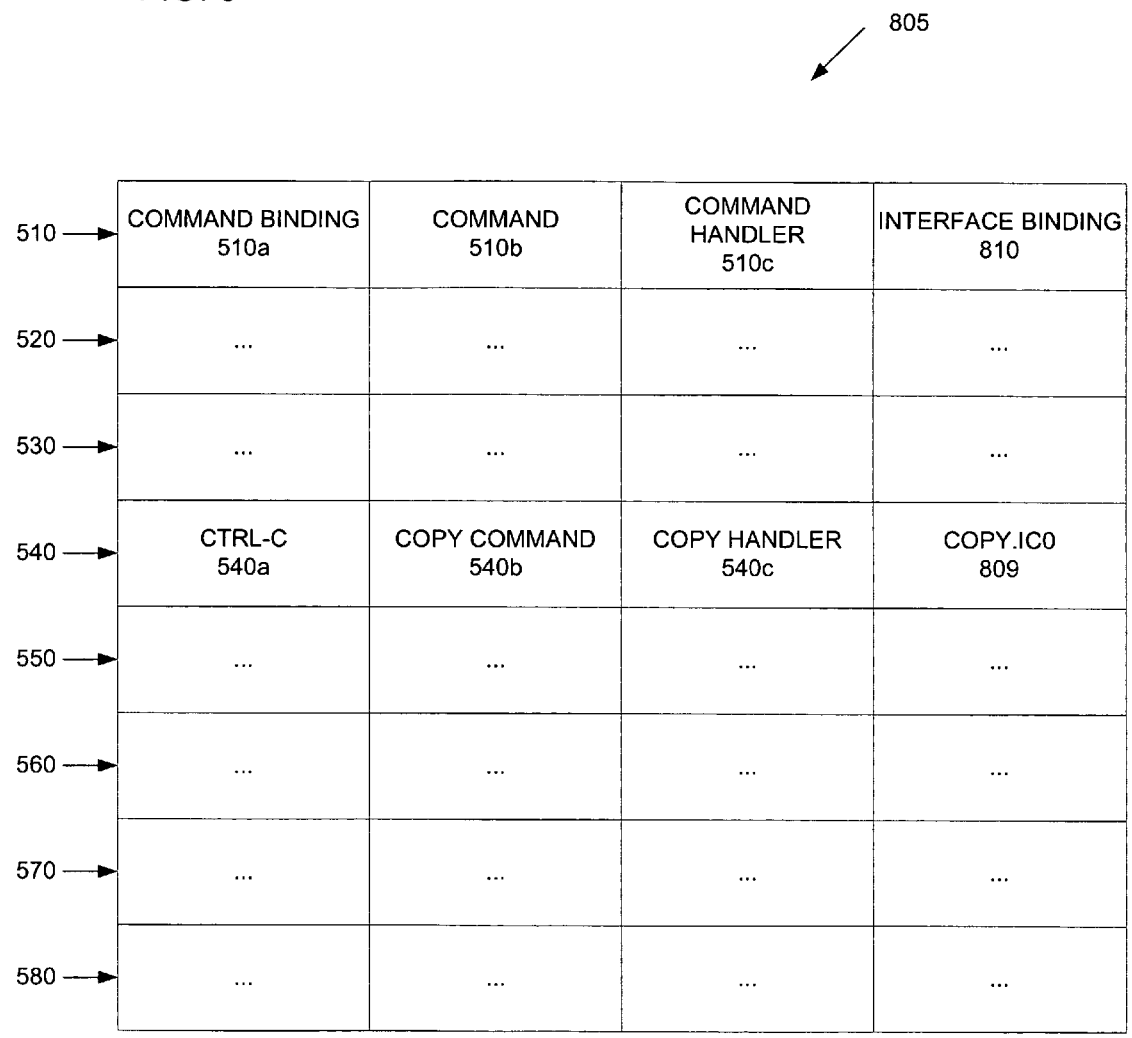
FIG. 8 illustrates a data structure according to an embodiment of the present invention.

FIG. 8 illustrates another example binding table 805. Binding table 805 includes a plurality of binding entries similar to binding table 500 illustrated in FIG. 5, including command binding 510a, command 510b, and command handler 510c. In addition, binding table 805 includes interface binding 810, as described below.

Interface bindings, such as interface binding 810, provide command interface information. Command interface information allows an application to dynamically generate a user interface. In the illustrated example, interface binding 809 provides command interface information related to a copy image button ("copy.ico") to be used when generating a toolbar including the copy command, as described further below.

Figure 9:
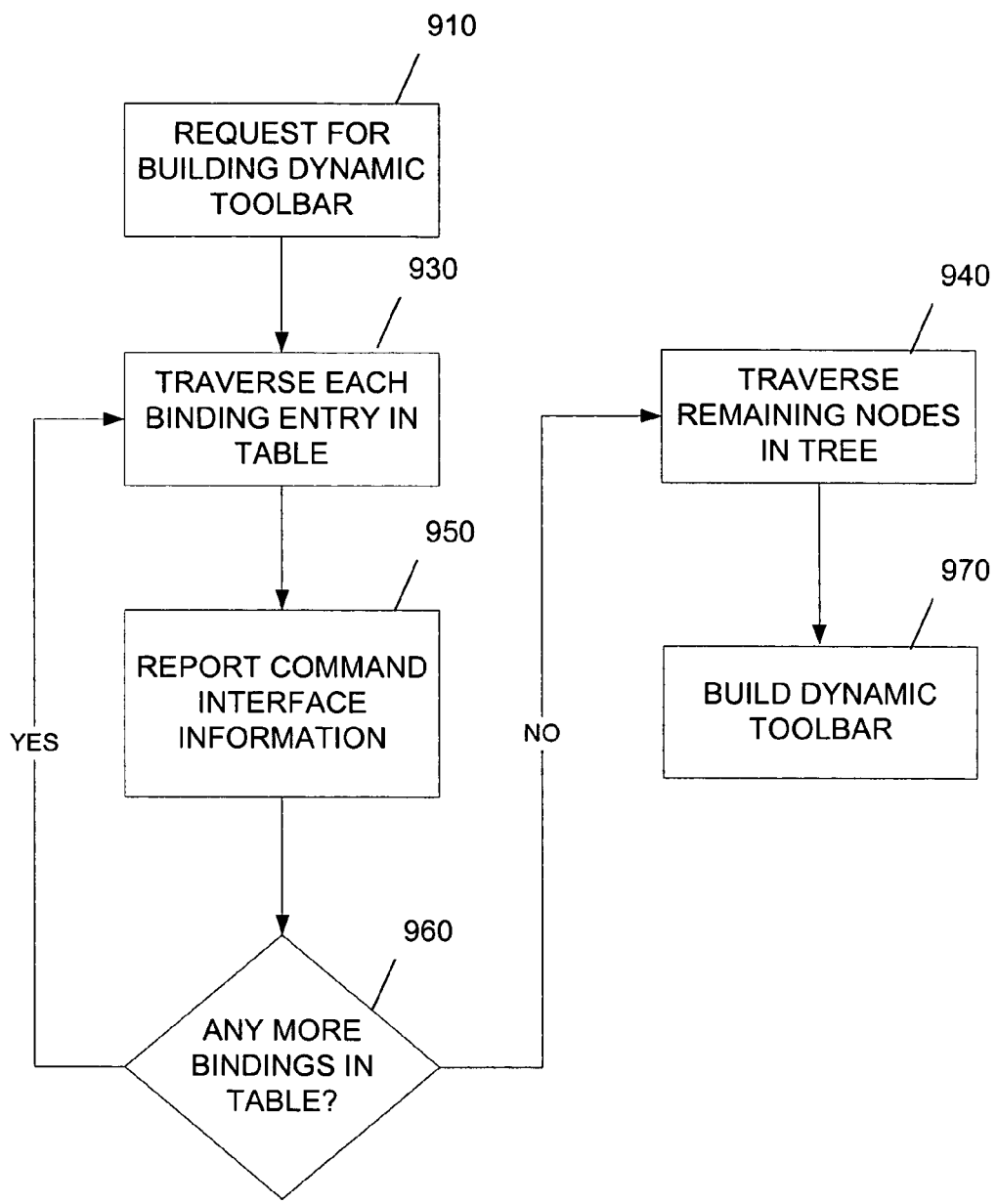
FIG. 9 illustrates an example flow diagram for dynamically generating a commanding interface according to an embodiment of the present invention.

For example, one embodiment of a method for dynamically generating a command interface is provided in FIG. 9. The method in FIG. 9 assumes that an application includes a commanding system having a logical tree similar to tree 400 illustrated in FIG. 4. By traversing the table bindings associated with the nodes of the tree, a command interface is dynamically generated.

At operation 910, the application generates a request for a dynamically-generated toolbar. This request can, for example, be made at the time the application is run (i.e., run-time), so that the toolbar is dynamically generated and provided as a toolbar within the application.

Generally, once the request for a dynamically-generated toolbar is made, at operation 930 the tree logically representing the application is traversed from node to node as described above with respect to tree 400. At each node, the binding entries in each binding table are traversed, and command interface information is gathered.

For example, at operation 950, interface binding information is reported as each binding entry in the binding table is traversed. For example, for binding entry 540 illustrated in FIG. 8, the interface binding 809 related to the toolbar icon is reported as binding table 805 is traversed.

At operation 960, if additional binding entries remain to be traversed in the binding table, control is passed back to operation 930. If all binding entries have been examined, control is passed to operation 940, and the binding tables of the remaining nodes in the same lineage in the tree are examined in a similar manner by, for example, tunneling and bubbling.

When all nodes associated with an application have been examined, control is passed to operation 970, and the toolbar is dynamically generated based on the command interface information reported from the binding tables.

Figure 10:
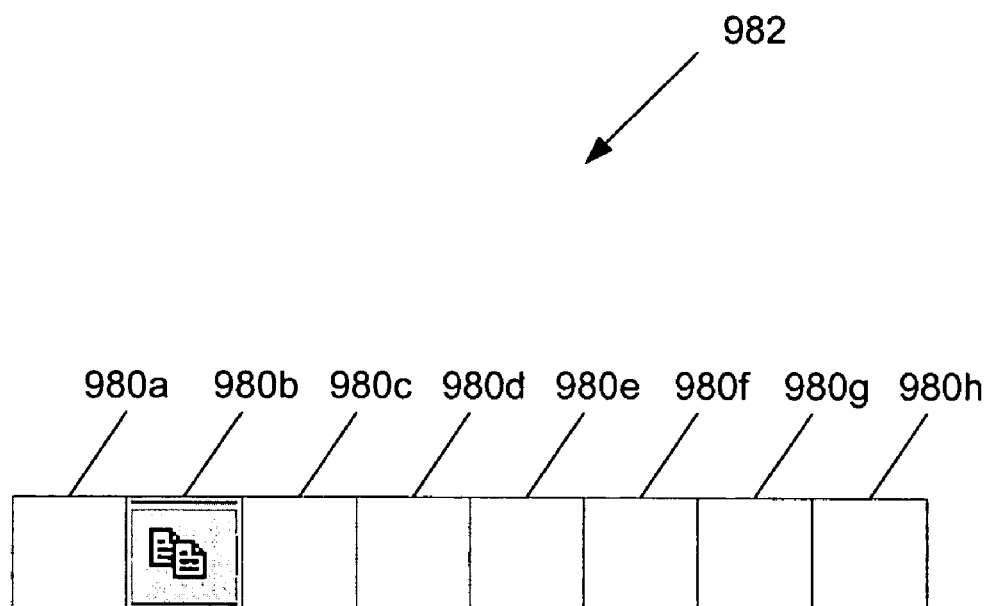
FIG. 10 illustrated an example dynamically-generated commanding interface according to an embodiment of the present invention.

For example, one embodiment of a dynamically-generated toolbar 982 made according to the method illustrated in FIG. 9 is shown in FIG. 10. The toolbar 982 includes a plurality of image button locations 980a-980h. For example, the image "copy.ico" associated with the interface binding 809 of binding entry 450 is located in location 980b of the toolbar 982. Other locations on the toolbar 982 can be similarly populated with other toolbar icons identified for other interface bindings in the binding tables.

If location 980b of toolbar 982 is subsequently selected by the user using, for example, a mouse, this input can be connected to the command handler for the copy command using the binding tables as described above.

In this manner, a toolbar is dynamically generated based on the command interface information provided in the binding tables such as binding table 805. An advantage of such a system is consistency. Since the toolbar is generated based, in part, on commanding information provided by control elements that are common among different applications, the toolbar will include at least a core set of commands provided by the control elements. In addition, the dynamically-generated toolbar can be beneficial if, for example, additional commanding information is added to the elements of the control level. The next time the toolbar is generated, the toolbar can reflect the additional commanding information added to the control level (e.g., a new command understood at the control level), without requiring changes to be made to the application.

Another advantage of such a system is the ability to automate the generation of the toolbar. Therefore, although commanding code sections can be scattered throughout different sections of the application code, as well as at different code sections at the control level, all of this commanding code can be automatically assembled and presented dynamically as the toolbar is generated.

Although the illustrated example of FIGS. 8-10 is a toolbar, other commanding interfaces can also be dynamically generated using similar commanding information such as, for example, a dynamically-generated menu. For example, interface binding information related to dynamically-generating a menu could include the position at which to place a given menu item in a menu.

In addition, other command interface information can be stored in entries in the binding table. Examples of other such command interface information include menu text, key bindings (for association with specific menu items), status bar text (for status bar information upon, for example, mouse-over), and tooltip text (for help information upon, for example, mouse-over). Other examples include sizes and colors for toolbar images and positional information for menu items.

In another example, command interface information can include information relating to whether a binding entry should be included with a dynamically-generated toolbar. For example, a command such as "move cursor left" would typically not be included in a dynamically-generated toolbar, since such a command is typically inputted by simply hitting the left arrow on the keyboard. In this manner, specific commands can be excluded from the toolbar.

The various embodiments described above are provided by way of illustration only and should not be construed to limit the invention. Those skilled in the art will readily recognize The claimed invention is:

1. A commanding system for a computer, comprising:
a memory storing:
    a binding table that connects input to associated action, wherein the associated action corresponds to a node of a hierarchical tree,
    at least one binding entry in the binding table including a command binding that identifies an input sequence from an input device that is received to be acted upon,
    a command that identifies an intent of the input sequence,
    a command handler that is a pointer to a portion of code that is executed to implement the action that is to be performed based upon the input sequence, and
    an interface binding that identifies a menu position on a menu; and
a processor in data communication with the memory, the processor programmed to:
    query each binding entry in the binding table;
    receive the interface binding associated with the binding; and
    automatically build the menu based on the interface binding, wherein automatically building the menu comprises the processor being programmed to,
        traverse the hierarchical tree to connect the input sequence to the associated action via the command binding,
        when the command binding is not found, bubble and tunnel the input sequence to a next higher or lower node in the hierarchical tree, and
        upon subsequent generation of the menu, include additional commanding information added to a control level without requiring changes to be made to a plurality of different applications, wherein the commanding information is provided by control elements that are common among the plurality of applications, and include at least a core set of commands provided by the control elements.

2. The system of claim 1, wherein the interface binding identifies an image to be used on a toolbar.

3. The system of claim 2, wherein the processor is further programmed to build a toolbar based on the interface binding.

4. The system of claim 1, wherein the memory includes a plurality of commanding elements with associated binding tables, and wherein the processor is programmed to traverse each binding entry in each of the binding tables of the commanding elements to generate the command interface.

5. A method for commanding a computer system, comprising:
    receiving a request to dynamically create a commanding interface;
    querying a single first binding table, the single first binding table including a plurality of binding entries, at least one binding entry of the plurality of bindings entries including a command binding, a command, a handler, and an interface binding, wherein the single first binding table connects an input to an associated action, and the associated action corresponds to a node of a hierarchical tree;
    querying a second binding table, the second binding table including a plurality of second binding entries, at least one second binding entry of the plurality of second binding entries including a second command binding, a second command, a second handler, and a second interface binding; and
    bubbling up through all tables of bindings associated with a given node to build the command interface;
    traverse the hierarchical tree to connect the input sequence to the associated action via the command binding,
    when the command binding is not found, bubble and tunnel the input sequence to a next higher or lower node in the hierarchical tree, and
    automatically building the commanding interface based on the interface binding provided for the binding entry, wherein automatically building the commanding interface comprises, upon a subsequent generation of the commanding interface, including additional commanding information added without requiring changes to be made to a plurality of different applications, wherein the commanding information is provided by control elements that are common among the plurality of applications, and including at least a core set of commands provided by the control elements.

6. The method of claim 5, wherein the step of building the commanding interface further comprises:
    identifying an image button associated based on the interface binding; and
    creating a toolbar using the image button.

7. The method of claim 5, wherein the step of building the commanding interface further comprises:
    identifying a menu position based on the interface binding; and
    positioning a menu item in the menu position.

* * * * *